June 19, 1945.　　R. R. TEICHNER　　2,378,596
VALVE
Filed March 3, 1942
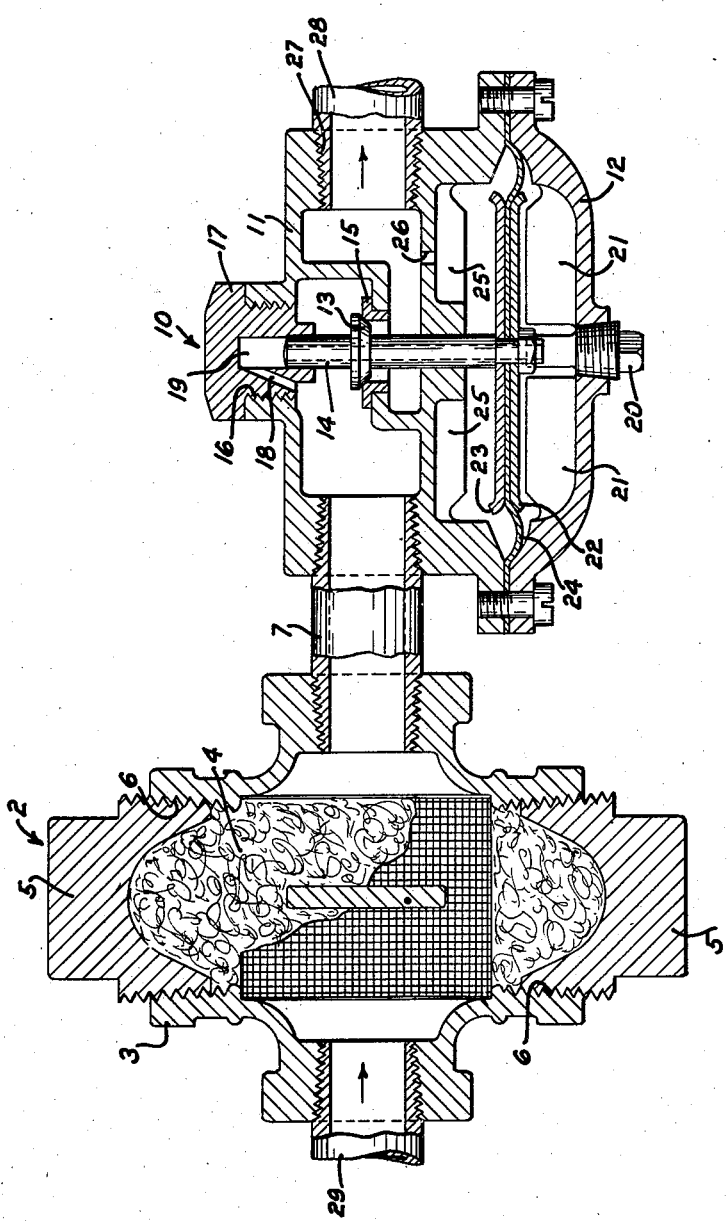
INVENTOR
R. R. TEICHNER
BY E. R. Nowlan
ATTORNEY Patented June 19, 1945

2,378,596

UNITED STATES PATENT OFFICE 2,378,596

VALVE

Rudolph R. Teichner, Jackson Heights, N. Y., assignor to Western Electric Company, Incorporated, New York, N. Y., a corporation of New York Application March 3, 1942, Serial No. 433,222

2 Claims. (Cl. 137—153)

This invention relates to valves, and more particularly to a gas check valve operable in response to low back pressure.

In using various devices employing gas and oxygen or gas and compressed air, a check valve may be used to prevent oxygen or air from entering the gas line when the device is shut off. Should oxygen or air enter the gas line, there may be danger of an explosion. However, the usual check valve requires a substantial back pressure to cause it to operate. Thus with relatively low back pressures, such as pressures of four or five inches of water column, it has been found that many check valves will not operate, and yet in some operations it may be desirable to keep the gas and oxygen or air pressures as low or sometimes even lower than four or five inches of water column.

It is an object of the present invention to provide a simple and reliable valve which will operate in response to pressure.

In accordance with this object, this invention may be embodied by providing a sectional casing. An inlet aperture and an outlet aperture are provided in the upper section and a movable valve member is suitably mounted therebetween on a hollow valve stem. A diaphragm is also mounted on the valve stem and is positioned in the lower section of the casing. The upper and lower sections are shut off from each other except for a small orifice in the lower section communicating with the outlet side of the upper section so as to permit any back pressure to exert itself on the top of the diaphragm and close the valve. A filter may be used with this valve assembly to reduce accumulation of dirt in the valve.

Other objects and advantages will appear from the following detailed description of one embodiment of the invention taken in conjunction with the accompanying drawing, wherein The figure is a vertical longitudinal section showing a valve assembly and filter therefor.

In the embodiment of this invention shown in the drawing, a filter unit 2 is shown, having a metal casing 3 in which is inserted a filter cartridge 4. This cartridge is held in place by two threaded members 5 which may be screwed into threaded openings 6 at either end of the casing. A nipple 7 connects this filter unit to a check valve assembly 10.

This valve assembly comprises integral upper and lower sections, the upper section being formed by a casing 11, while the lower section is formed by this casing and a removable plate 12. A valve 13 is mounted on a hollow valve stem 14 so as to contact a valve seat 15, and thus control the flow of gas through the valve assembly. The casing is also apertured and threaded at 16 to receive a threaded insert 17. This insert has a small aperture 18 running from its base to its center. At the center of this insert there is a hollow portion 19 of suitable size and depth to slidably accommodate the upper end of the hollow valve stem.

The removable plate 12 is suitably attached to the casing and is provided with a removable drain plug 20. Radially positioned ribs 21 are formed in this plate and serve to limit the downward movement of a diaphragm 24 which may be made of neoprene or other suitable resilient material. This diaphragm is mounted on the lower end of the valve stem. Plates 22 and 23 which may be made of aluminum or other light material are positioned on either side of the diaphragm and cooperate in holding the diaphragm substantially flat. The diaphragm is clamped and supported at its edges by the plate and casing. A second set of radially positioned ribs 25 are mounted on the lower side of the bottom of the casing and limit the upward movement of the diaphragm assembly. An orifice 26 is provided in the casing and is positioned so as to permit free flow of gas between the lower section and the outlet side of the upper section. Thus any back pressure will exert itself on the upper side of the diaphragm, forcing it downward. A threaded outlet aperture 27 is provided at one side of the upper section and a pipe 28 (shown fragmentally) may be screwed therein to convey gas to the apparatus or device with which this check valve may be used. A pipe 29 (also shown fragmentally) is connected to the filter unit and may be connected to a suitable source of gas supply.

In the operation of this device, gas under pressure passes through the filter unit and enters the valve assembly. If the apparatus or device is in operation and gas is being used, there will be no back pressure and the pressure of the gas which passes through the aperture 18 and down through the hollow valve stem 14 to exert itself on the bottom of the diaphragm will be sufficient to overcome the weight of the valve and diaphragm assembly and to lift the valve 13, thus permitting gas to flow freely through the upper section of the valve assembly. On the other hand, if there is back pressure, due to the fact that no gas is being used, the pressure will be exerted on the top of the diaphragm, the gas and oxygen or air forcing its way back through the opening 27 and the small aperture 26. This pressure combined with the weight of the valve and diaphragm assembly is sufficient to overcome the pressure being exerted on the bottom of the diaphragm and the valve therefore closes, thus preventing oxygen or air from working its way back to the main gas line. When, however, back pressure is removed by operating the device with which this check valve is intended to be used, the pressure on the top of the diaphragm is reduced and then the pressure on the bottom of the diaphragm forces the diaphragm upwards and opens the valve. Due to the weight of the valve, valve stem and diaphragm assembly, the valve is normally closed when no gas is being supplied to the valve assembly from the gas supply line.

It has been found that this valve will close and remain closed upon encountering a back pressure as low as 0.2 of an inch of water column. Further than this, should the diaphragm be punctured, no gas can be obtained at the device being serviced because the valve will remain closed since the diaphragm will not then lift the valve 18 and the defect will be immediately discovered. This check valve has been used successfully with torches, furnaces and ovens employing gas and oxygen or gas and compressed air, and has been found, as aforesaid, to operate under pressures much lower than required for check valves heretofore available.

While but one embodiment of this invention has been shown it will be understood that this is merely illustrative and may be substantially modified or altered without departing from the scope and spirit of the present invention.

What is claimed is:

1. In a fluid control valve having a casing, an inlet and an outlet chamber formed by said casing, a valve between said chambers, a diaphragm chamber formed in the base of said casing, a plate for enclosing said diaphragm chamber, a hollow valve stem associated with said valve, a movable diaphragm fixed to said valve stem and positioned in said diaphragm chamber, a bearing in said casing for engaging the upper portion of said valve stem to guide said stem in a predetermined direction, an orifice extending through said bearing from said inlet chamber and communicating with said hollow valve stem, the other end of said hollow valve stem communicating with the diaphragm chamber to permit pressure uniformly equal to the pressure in the inlet chamber to be exerted on said diaphragm to open said valve when the pressure in the inlet chamber exceeds the pressure in the outlet chamber, and said outlet chamber communicating with said diaphragm chamber to permit back pressure to be exerted on said diaphragm to close said valve when the pressure from the outlet chamber exceeds the force exerted on the diaphragm tending to hold it open.

2. In a fluid control valve having a casing, an inlet and an outlet chamber formed by said casing, a valve between said chambers, a diaphragm chamber formed in the base of said casing, a hollow valve stem associated with said valve, a movable diaphragm fixed to said valve stem and positioned in said diaphragm chamber, a bearing in said casing for engaging said valve stem to guide said stem, an orifice extending through said bearing from said inlet chamber and communicating with said hollow valve stem, the other end of said hollow valve stem communicating with the diaphragm to apply a uniform pressure equal to the pressure in the inlet chamber to said diaphragm to open said valve when the pressure in the inlet chamber exceeds the pressure in the outlet chamber, and said outlet chamber communicating with said diaphragm chamber to permit back pressure to be exerted on said diaphragm to close said valve when the pressure from the outlet chamber exceeds the force exerted on the diaphragm tending to hold it open.

RUDOLPH R. TEICHNER.